US009950866B2

United States Patent
Lewis et al.

(10) Patent No.: US 9,950,866 B2
(45) Date of Patent: Apr. 24, 2018

(54) APPARATUS AND METHOD FOR DRIVING LOW COEFFICIENT OF FRICTION BELTING

(71) Applicants: William C. Lewis, Saint Charles, IL (US); William J. Lewis, Naples, FL (US); Barton R. Lewis, Sr., Algonquin, IL (US); Bart R. Lewis, Jr., Algonquin, IL (US); Kevin Dunlea, Cary, IL (US); Malcolm Swift, Lake in the Hills, IL (US)

(72) Inventors: William C. Lewis, Saint Charles, IL (US); William J. Lewis, Naples, FL (US); Barton R. Lewis, Sr., Algonquin, IL (US); Bart R. Lewis, Jr., Algonquin, IL (US); Kevin Dunlea, Cary, IL (US); Malcolm Swift, Lake in the Hills, IL (US)

(73) Assignee: Advanced Flexible Composites, Inc., Lake In The Hills, IL (US)

( * ) Notice: Subject to any disclaimer, the term of this patent is extended or adjusted under 35 U.S.C. 154(b) by 0 days.

(21) Appl. No.: 15/079,163

(22) Filed: Mar. 24, 2016

(65) Prior Publication Data

US 2017/0275097 A1    Sep. 28, 2017

(51) Int. Cl.
| | |
|---|---|
| *B65G 15/64* | (2006.01) |
| *B65G 39/02* | (2006.01) |
| *B65G 15/32* | (2006.01) |
| *B65G 23/06* | (2006.01) |

(52) U.S. Cl.
CPC ............ *B65G 15/64* (2013.01); *B65G 15/32* (2013.01); *B65G 23/06* (2013.01); *B65G 39/02* (2013.01)

(58) Field of Classification Search
CPC ........ B65G 15/64; B65G 23/04; B65G 23/06; B65G 39/071; B65G 15/32; B65G 15/42; B65G 15/46; B65G 39/02
USPC .................................................. 198/834, 835
See application file for complete search history.

(56) References Cited

U.S. PATENT DOCUMENTS

| | | | | |
|---|---|---|---|---|
| 207,626 | A * | 9/1878 | Sargent | F16H 55/36 139/384 R |
| 2,724,974 | A | 11/1955 | Ayres | |
| 3,853,016 | A * | 12/1974 | Lane, III | A01D 45/023 198/516 |
| 4,011,939 | A * | 3/1977 | Conrad | B65G 15/46 198/840 |
| 4,072,062 | A * | 2/1978 | Morling | A01D 45/023 198/494 |
| 4,127,040 | A * | 11/1978 | Moore | B29D 29/00 474/167 |

(Continued)

OTHER PUBLICATIONS

PCT International Search Report, Form PCT/ISA/210, dated Jun. 8, 2017, (3 pages).

(Continued)

*Primary Examiner* — Mark A Deuble
(74) *Attorney, Agent, or Firm* — Pauley Erickson & Koltis

(57) ABSTRACT

A drive or tracking apparatus for a non-metal endless conveyor belt. The apparatus includes a plurality of spaced apart traction cleats molded from a polymer material and each extending outward from a surface of the endless conveyor belt. The cleats correspond to cup depressions formed in rollers for a conveying apparatus to provide positive drive and anti-slip features for the belt.

20 Claims, 2 Drawing Sheets

(56) References Cited

U.S. PATENT DOCUMENTS

| | | | | |
|---|---|---|---|---|
| 5,320,214 A | * | 6/1994 | Kordis | B65G 15/64 198/750.1 |
| 5,868,639 A | | 2/1999 | Hörmann | |
| 5,911,307 A | * | 6/1999 | Kraft | B65G 15/64 198/846 |
| 6,919,122 B2 | * | 7/2005 | Keese | A47J 36/02 198/461.3 |
| 7,021,457 B1 | * | 4/2006 | Schiltz | B65G 15/64 198/835 |
| 7,681,717 B2 | * | 3/2010 | DeGroot | B65G 15/30 198/832 |
| 9,321,592 B2 | * | 4/2016 | Tajima | B65G 15/34 |
| 2008/0146391 A1 | | 6/2008 | DeGroot | |
| 2011/0296863 A1 | | 12/2011 | Bergqvist et al. | |

OTHER PUBLICATIONS

PCT Written Opinion of the International Searching Authority, Form PCT/ISA/237, dated Jun. 8, 2017, (5 pages).

\* cited by examiner

APPARATUS AND METHOD FOR DRIVING LOW COEFFICIENT OF FRICTION BELTING

BACKGROUND OF THE INVENTION

This invention relates generally to conveyor belts and, more particularly, to a drive mechanism for endless conveyor belts.

Low coefficient of friction conveyor belts, such as polytetrafluoroethylene (PTFE) and silicone belting, are used in numerous applications, such as food processing/cooking, screen printing, rubber curing, etc. Many food processing or cooking devices use silicone rubber or other rubber coated rollers for driving belts and a separate mechanism for belt tracking. These belts tend to slip when grease/oil gets on to the drive rollers, causing the user to over-tension and prematurely destroy the belts. Metal cleats have been riveted to belts to provide a tracking mechanism, but can rip the belt leading to premature failure and a risk of the cleats falling off into the food product. There is thus a continuing need for improved drive and tracking mechanisms for conveyor belts.

SUMMARY OF THE INVENTION

The invention provides an improved drive or tracking apparatus and method for an endless conveyor belt, such as a low coefficient of friction conveyor belt. A general object of the invention can be attained, at least in part, through a drive or tracking apparatus for an endless conveyor belt, that includes a plurality of spaced apart traction cleats formed from a non-metal material, such as a polymer material and more desirably a heat resistant polymer material. Each of the cleats extends outward from a surface of the endless conveyor belt to engage with corresponding cup depressions in a roller of the conveying device.

The invention further includes a conveyor assembly including at least a pair of rollers, each including a roller surface with a cup depression extending into the rollers and around a circumference of the roller surface. An endless conveyor belt is disposed around the rollers. The belt has a bottom surface in contact with each surface of the pair or rollers. The bottom surface includes a plurality of spaced apart traction cleats formed from a non-metal material or from a non-metal material band with non-metal cleats connected to the bottom surface of the endless conveyor belt. The band can be formed of a polymer material and includes a positive drive or tracking strip formed of a plurality of spaced apart traction cleats each molded from the polymer material, and each integrally formed with and/or extending from a surface facing away from the conveyor belt. During use, a section of the positive drive or tracking strip is disposed within each cup depression of the pair of rollers to drive the belt with the rolling roller.

The invention further includes methods of driving the cleated belts with corresponding rollers having depressions to receive and push the cleats. The invention further includes methods for manufacturing belts with cleats.

As used herein, references to the term "non-metal" or "non-metallic" are to be understood to refer to an element or material being devoid of metal.

Further, references herein "heat resistant" refers to the ability of a material to withstand temperatures of about 400° F. (about 204.4° C.) or greater.

Other objects and advantages will be apparent to those skilled in the art from the following detailed description taken in conjunction with the appended claims and drawings.

DETAILED DESCRIPTION OF THE INVENTION

Figure 1:
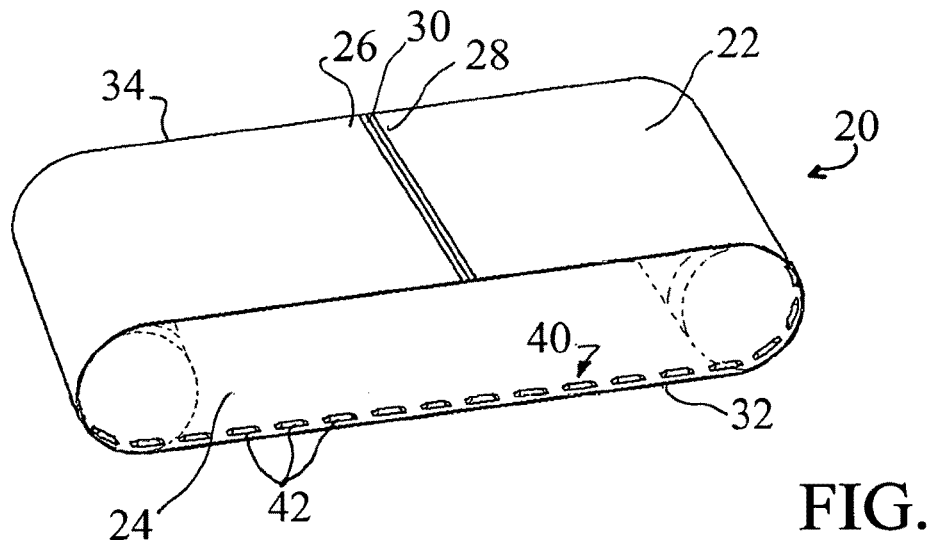
FIG. 1 illustrates a drive or tracking apparatus on an endless conveyor belt, according to one embodiment of this invention.

FIG. 1 shows a conveyor belt 20 having a drive or tracking apparatus according to one embodiment of this invention. The conveyor belt 20 is an endless conveyor belt designed to extend around two or more conveyor rollers (shown in phantom). A first, outer surface 22 is disposed away from the rollers to hold the item to be conveyed, and a second, inner surface 24 contacts the rollers. The conveyor belt 20 is, or has surfaces 22, 24, formed of a low coefficient of friction material. The ends 26, 28 of the endless belt 20 are connected by a lacing 30 or other connection known in the art of conveyor belts.

A positive drive or tracking strip 40 is disposed on the second surface 24 along a longitudinal side edge 32 of the belt 20. A second positive drive or tracking strip (not shown) is desirably disposed parallel on the second surface 24 along a second longitudinal side edge 34 of the belt 20. In the embodiment of FIG. 1, the strip 40 is formed of a plurality of spaced apart, non-metal traction cleats 42 formed from a polymer material and each extending outward from the belt surface 24. In embodiments of this invention, the cleats 42 can be formed directly on the surface 24 when the material used to form the cleats 42 is the same or otherwise compatible for attachment on or with the material of surface 24. For example, silicone cleats can be directly formed from or directly applied to a silicone surface. The cleats can be molded when forming surface 24, or can be applied in a further, separate step.

As will be appreciated, various and alternative sizes, shapes, materials, and configurations are available for the belts and cleats of this invention. Suitable polymer materials include, for example, heat resistant polymers such as fluoropolymers, fluoroelastomers, silicone rubbers, silicone resins, urethane rubbers, urethane resins, polyketones, polyamide-imides, polyphenylene sulfides, liquid crystal polymers, liquid crystal polyesters, polyether sulfones, or combinations thereof. Also, in FIG. 1, each of the cleats 42 has a longer dimension aligned parallel with a longitudinal axis of the belt, and angled ends disposed at a non-perpendicular angle with respect to the surface of the belt. The cleat length, width, and height, as well as the shape of the top, sides, and ends can vary depending on need. In currently preferred embodiments of the invention, each of the cleats has at least one of a length of about 1 centimeter to about 4 centimeters, a width of about 1 centimeter to about 5 centimeters, and/or a height of about 0.5 centimeters to about 2.75 centimeters. As also shown in FIG. 1, the cleats 42 are collinearly aligned end-to end along the side edge 32. The cleats can also be collinearly aligned along a longitudinal center line of the endless conveyor belt, or elsewhere on the belt, depending on need.

Figure 2:
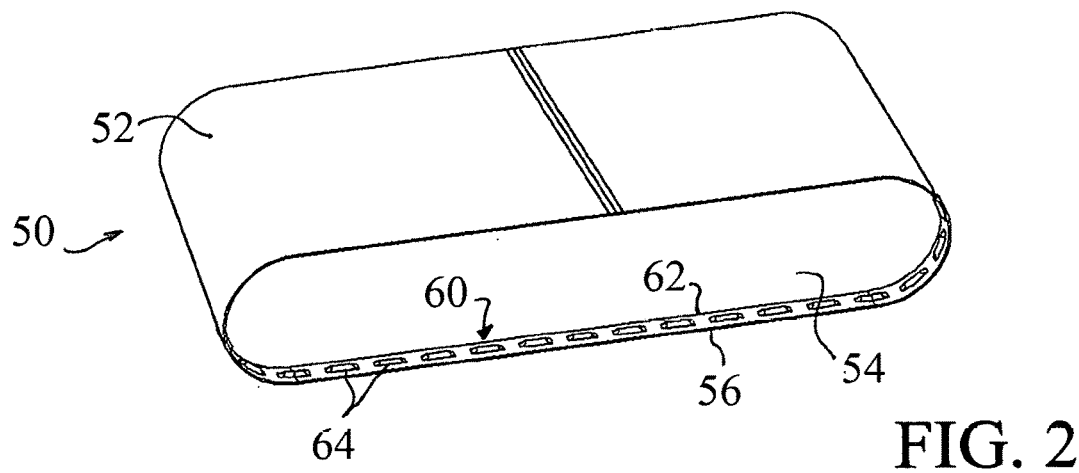
FIG. 2 illustrates a drive or tracking apparatus on an endless conveyor belt, according to another embodiment of this invention.
Figure 3:
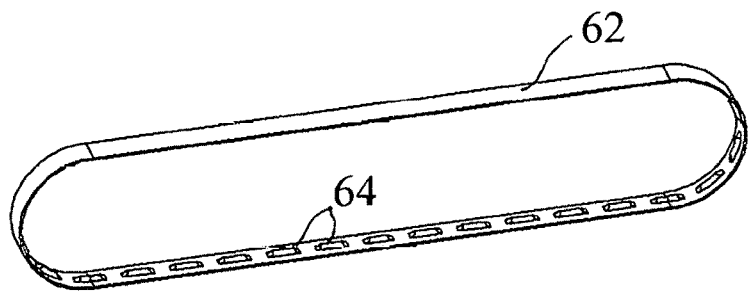
FIG. 3 illustrates a drive or tracking apparatus, according to one embodiment of this invention.

FIG. 2 shows a conveyor belt 50 having a drive or tracking apparatus according to another embodiment of this invention. The belt 50 is similar to the belt in FIG. 1, and has a first, outer surface 52 disposed away from conveyor rollers and a second, inner surface 54 to contact rollers. The belt 50 includes a positive drive or tracking strip 60 disposed along a longitudinal side edge 56 of the second surface 54. The strip 60 includes a material band 62 formed of a non-metal material and disposed between the second surface 54 and a plurality of spaced apart traction cleats 64. The material band 62 is a same or compatible material as the cleats 64. The material band 62 is useful for attaching the cleats 64 to the belt 50, such as when the belt is a different and/or non-compatible material from the cleats (e.g., silicone rubber cleats on a PTFE surface), or other manufacturing advantages. The material band 62 can be applied to the belt 50 and then the cleats 64 can be applied to the band 62, or the cleats 64 and band can be separately formed together, such as shown in FIG. 3, and then applied to the belt.

Various and alternative sizes, shapes, materials, and configurations are available for the material band and cleats according to this invention. The material band and cleats can be any suitable polymer, such as a heat resistant polymer described above, and can include a reinforcement material formed of high temperature fibers or fabric, such as fiberglass, nylon, polyester, aramid, polyethylene, polyolefin, ceramic, polysulfone, polyketone, polyphenylene polyimide, or combinations thereof.

The material band can be formed using any suitable method, such as extrusion, injection molding, or lamination, and applied to the belt by any suitable method, such as stitching, adhesive bonding, lamination, heat welding, overmolding, squirting, painting, or similar process. In one embodiment, such as for toaster oven belts, a PTFE coated fiberglass substrate is treated with an etchant made with silica and fluoropolymer. To apply the cleats a liquid silicone rubber is applied to the etched surface using a robot squirting mechanism. The resulting drive or tracking apparatus strip can be applied to the belt by heat welding the PTFE fabric edge to the PTFE belt substrate. Another exemplary method forms the liquid silicone rubber cleats by robot squirting to a silicone coated fiberglass substrate. The resulting drive or tracking apparatus strip in this situation can be applied to the belt by sewing the silicone fabric material band to the PTFE belt substrate.

Figure 4:
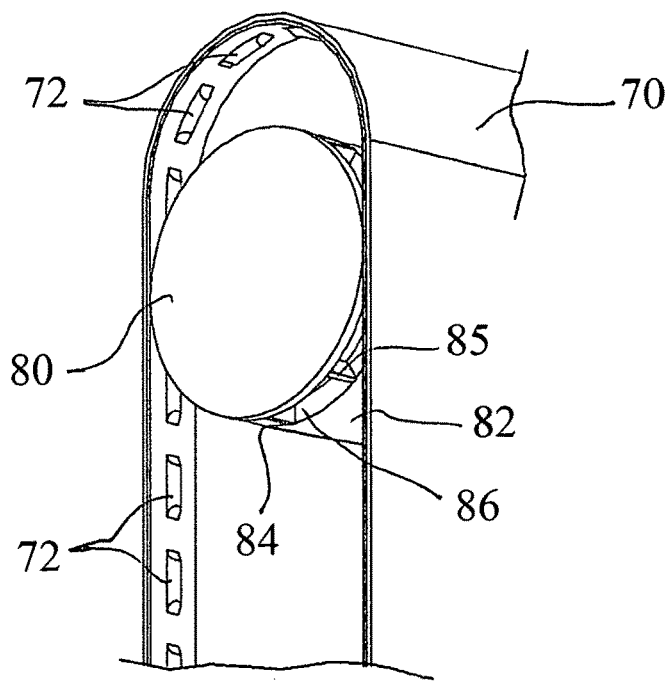
FIG. 4 is an exploded view of a belt with a roller, according to one embodiment of this invention.
Figure 5:
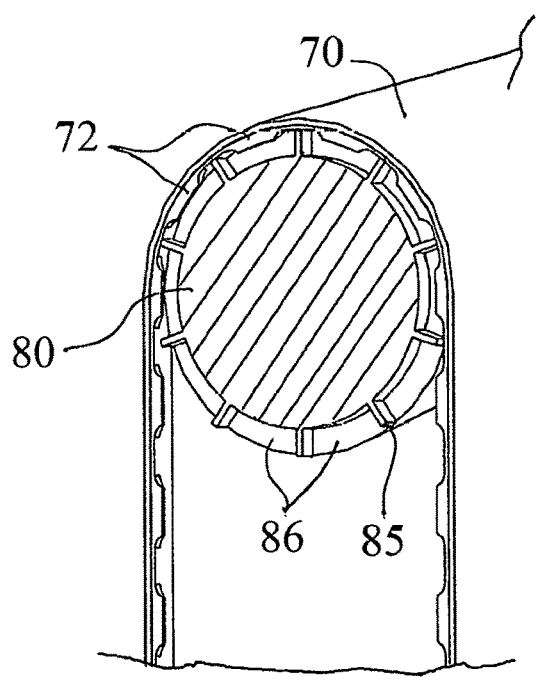
FIG. 5 is a sectional view of the belt and roller of FIG. 4.

FIGS. 4 and 5 illustrate a belt 70 according to this invention in combination with a roller 80 of a conveyor assembly. The roller 80 has a roller surface 82 with a cup depression 84 extending around the surface 82 circumference. The cup depression includes a plurality of divided cups 86 separated by cup walls 85 and extending about the roller 80, each correspondingly sized to receive one of the molded polymer cleats 72 on the belt. As the roller 80 rotates on its longitudinal axis, each cleat 72 moves in a corresponding cup 86, pushed by a corresponding cup wall 85, until the cleat 72 leaves the cup 86. The belt 70 can be powered by the cleats 72, thereby providing an anti-slip, positive belt drive mechanism. Alternatively, or additionally for a second non-powered roller, the cleats may drive the roller and keep the belt and roller in sync. As will be appreciated by those skilled in the art following the teachings herein, the size and/or spacing of the cleats corresponds to a size and/or spacing of cups 86 on the roller 80.

Thus, the invention provides a belt having improved drive and tracking with the underlying rollers. The cleated belts of this invention can be sized and used in any suitable conveyor assembly, and are particularly useful in cooking applications such as toaster ovens or similar oven applications where grease and oil buildup causes conventional belt slipping.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A drive or tracking apparatus for an endless conveyor belt, comprising a plurality of spaced apart traction cleats formed from a polymer material and each extending outward from a surface of the endless conveyor belt, wherein each of the cleats has a longer dimension aligned parallel with a longitudinal axis of the belt, and a height of about 0.5 centimeters to about 2.75 centimeters, wherein the spaced apart traction cleats are collinearly aligned end-to-end and for the each of the cleats each end of the longitudinal direction is disposed at a non-perpendicular angle with respect to the surface of the belt and inward to form a cleat top surface that has a length shorter than an opposing cleat bottom attached to the surface of the endless conveyor belt, and the polymer material comprises a fluoropolymer, a fluoroelastomer, a silicone rubber, a silicone resin, a polyketone, a polyamide-imide, a polyphenylene sulfide, a liquid crystal polymer, liquid crystal polyester, a polyether sulfone, or combinations thereof.

2. The drive or tracking apparatus according to claim 1, wherein each of the cleats is molded from the polymer material.

3. The drive or tracking apparatus according to claim 1, wherein the apparatus does not include any metal.

4. The drive or tracking apparatus according to claim 1, wherein the belt comprises a silicone surface and the plurality of spaced apart traction cleats comprise silicone disposed directly on the silicone surface.

5. The drive or tracking apparatus according to claim 1, further comprising a material band formed of the polymer material and disposed between the endless conveyor belt and the plurality of spaced apart traction cleats.

6. The drive or tracking apparatus according to claim 5, wherein the material band comprises a reinforcement material formed of high temperature fibers or fabric.

7. The drive or tracking apparatus according to claim 5, wherein the material band comprises a silicone material and the plurality of spaced apart traction cleats comprise silicone disposed directly on and formed integrally with the silicone material.

8. The drive or tracking apparatus according to claim 5, wherein the material band is attached to the endless conveyor belt by stitching, adhesive bonding, lamination, or by being integrally formed to the endless conveyor belt.

9. The drive or tracking apparatus according to claim 1, wherein the plurality of spaced apart traction cleats is attached along an edge of the endless conveyor belt.

10. The drive or tracking apparatus according to claim 9, further comprising a second plurality of spaced apart traction cleats attached along an opposing second edge of the endless conveyor belt bottom surface.

11. The drive or tracking apparatus according to claim 1, wherein each of the cleats comprises ends disposed at a non-perpendicular angle with respect to the surface of the belt.

12. The drive or tracking apparatus according to claim 1, wherein each of the cleats has at least one of:
   a length of about 1 centimeter to about 4 centimeters; or
   a width of about 1 centimeter to about 5 centimeters.

13. The drive or tracking apparatus according to claim 1, wherein the surface of the endless conveyor belt comprises a fluoropolymer or a fluoroelastomer surface and the plurality of spaced apart traction cleats comprises a silicone material, and further comprising a material band comprising the silicone material and disposed between the endless conveyor belt and the plurality of spaced apart traction cleats.

14. The drive or tracking apparatus according to claim 13, wherein the material band comprises a reinforcement material formed of high temperature fibers or fabric.

15. A drive or tracking apparatus for an endless conveyor belt, comprising:
   a plurality of spaced apart traction cleats formed from a polymer material and each extending outward from a surface of the endless conveyor belt, wherein each of the cleats has a longer dimension aligned parallel with a longitudinal axis of the belt, and a height of about 0.5 centimeters to about 2.75 centimeters, wherein the polymer material comprises a fluoropolymer, a fluoroelastomer, a silicone rubber, a silicone resin, a polyketone, a polyamide-imide, a polyphenylene sulfide, a liquid crystal polymer, liquid crystal polyester, a polyether sulfone, or combinations thereof; and
   a conveyor roller including a cup depression formed extending inward about a surface of the conveyor roller and including cup walls dividing the cup depression into a plurality of divided cups each corresponding to one of the plurality of spaced apart traction cleats, wherein a size of and spacing between the cleats corresponds to a size of each of the divided cups.

16. The drive or tracking apparatus according to claim 15, wherein the spaced apart traction cleats are collinearly aligned end-to-end and each end of the longitudinal direction is disposed at a non-perpendicular angle with respect to the surface of the belt and inward to form a cleat top surface that has a length shorter than an opposing cleat bottom attached to the surface of the endless conveyor belt.

17. A conveyor assembly, comprising:
   a drive or tracking apparatus for an endless conveyor belt, comprising a plurality of spaced apart traction cleats formed from a polymer material and each extending outward from a surface of the endless conveyor belt, wherein each of the cleats has a longer dimension aligned parallel with a longitudinal axis of the belt, and a height of about 0.5 centimeters to about 2.75 centimeters, wherein the polymer material comprises a fluoropolymer, a fluoroelastomer, a silicone rubber, a silicone resin, a polyketone, a polyamide-imide, a polyphenylene sulfide, a liquid crystal polymer, liquid crystal polyester, a polyether sulfone, or combinations thereof;
   a pair of rollers, each including a roller surface with a cup depression extending there around, and cup walls dividing the cup depression into a plurality of divided cups;
   the endless conveyor belt having the surface in contact with each surface of the pair or rollers; and
   the drive or tracking apparatus forming a positive drive or tracking strip of the plurality of spaced apart traction cleats, wherein a section of the positive drive or tracking strip is disposed within each cup depression of the pair of rollers and a size of and spacing between the cleats corresponds to a size of each of the divided cups.

18. A conveyor assembly, comprising:
   a pair of rollers, each including a roller surface with a cup depression extending there around, the cup depression divided by a plurality of cup walls, each extending across the cup depression parallel to a longitudinal axis of a corresponding one of the rollers, into a plurality of divided cups each having a longer dimension perpendicular to the longitudinal axis of a corresponding one of the rollers;
   an endless conveyor belt having a bottom surface in contact with each surface of the pair or rollers; and
   a material band having a band top surface connected to the bottom surface of the endless conveyor belt, the band formed of a polymer material and including a positive drive or tracking strip formed of a plurality of spaced apart traction cleats each molded from the polymer material, each integrally formed with and extending from a band bottom surface facing away from the conveyor belt with a height of about 0.5 centimeters to about 2.75 centimeters, and each of the cleats having a longer dimension aligned parallel with a longitudinal axis of the belt, wherein a section of the positive drive or tracking strip is disposed within each cup depression of the pair of rollers, wherein the polymer material comprises a fluoropolymer, a fluoroelastomer, a silicone rubber, a silicone resin, a polyketone, a polyamide-imide, a polyphenylene sulfide, a liquid crystal polymer, liquid crystal polyester, a polyether sulfone, or combinations thereof.

19. The conveyor assembly according to claim 18, wherein the material band is attached along an edge of the endless conveyor belt, and further comprising a second material band with a second positive drive or tracking strip attached along an opposing second edge of the endless conveyor belt bottom surface.

20. The conveyor assembly according to claim 18, wherein the band bottom surface and the plurality of spaced apart traction cleats are each formed of silicone.

* * * * *